HENRY R. ROBBINS.
Improvement in Traps for Wash Boilers.

No. 119,649.    Patented Oct. 3, 1871.

Witnesses:
G. Mathys.
Thos. D. D. Curand

Inventor:
Henry R. Robbins.
Per
Attorneys.

UNITED STATES PATENT OFFICE.

HENRY R. ROBBINS, OF BALTIMORE, MARYLAND.

IMPROVEMENT IN TRAPS FOR WASH-BOILERS.

Specification forming part of Letters Patent No. 119,649, dated October 3, 1871.

*To all whom it may concern:*

Figure 1:
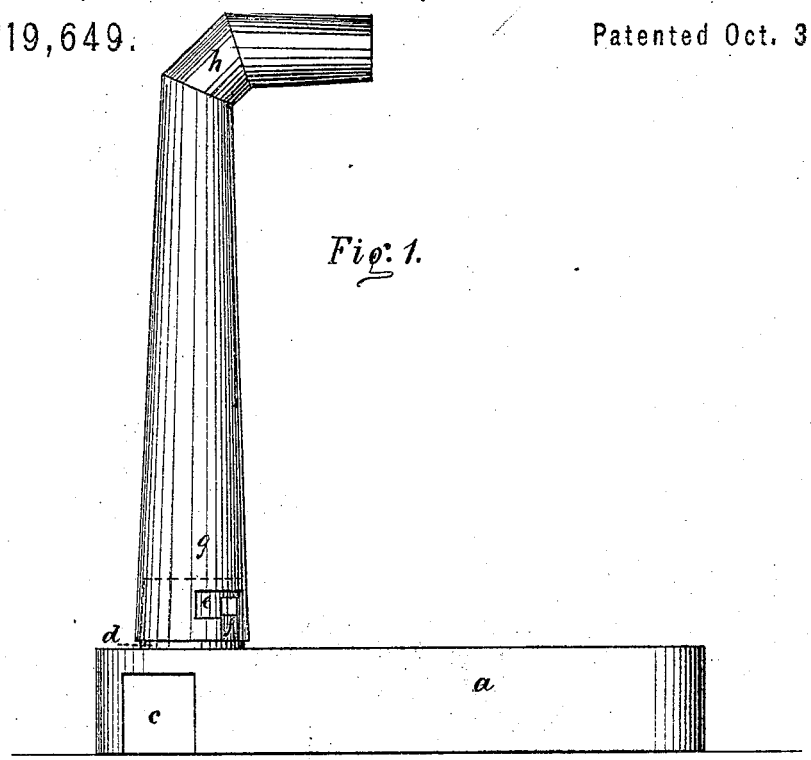
Figure 2:
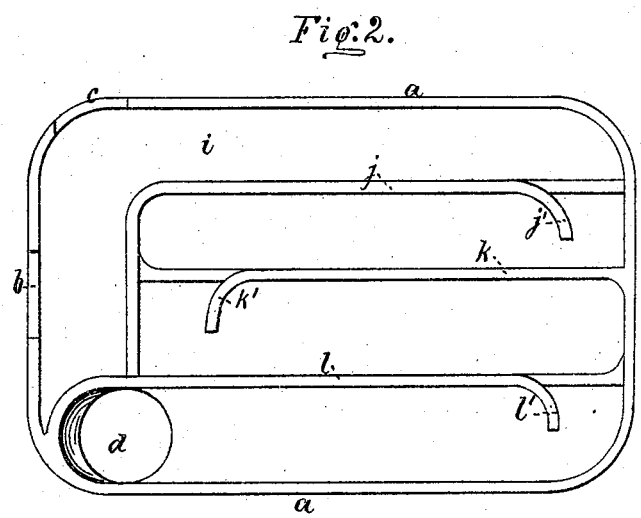

Be it known that I, HENRY R. ROBBINS, of Baltimore, in the county of Baltimore and State of Maryland, have invented certain Improvements in Automatic Trap for Wash-Boilers, of which the following is a specification:

Figure 1 is a side elevation, and Fig. 2 is a bottom view.

This invention consists in a device intended to be placed on the bottom of a wash-boiler, and operating to gather up water under steam-pressure and to conduct it upward through a vertical pipe having an elbow at its top, from which the water is ejected with much force and played in a stream within the boiler upon the clothes, thereby assisting materially in cleansing the same.

Referring to the drawing, $a$ is the trap, consisting of a galvanized iron box closed at the top, and also at the sides and ends, except as to orifices $b\ c$ in the same, and open at its bottom. From one corner of the top of the trap rises a short tube, $d$, opening into the inside of the trap, with which is connected, by a lantern-joint, $e\ f$, a vertical pipe, $g$, having an elbow, $h$, at its top. By means of the lantern-joint the pipe $h$ can be readily connected with the tube $d$ or disconnected from it. The orifices $b\ c$ open into a passage, $i$, formed at the end and side of the trap and within the same, by means of a partition, $j$, extending downward from the under side of the top of the trap. The partition $j$ terminates in a curve, $j'$, extending toward the parallel partition $k$. The latter terminates in a curve, $k'$, extending toward the parallel partition $l$, which partition terminates in a curve, $l'$, extending toward the contiguous side of the trap. The several partitions form a zigzag passage, along which, when the boiler is covered and the water within it heated, water is forced by steam-pressure. The curves $j'\ k'\ l'$ prevent the water from flowing backward, and hence it flows continually forward, and enters the tube $d$ and pours in an unbroken stream through and out of the pipe $g$, the force of which stream is much increased by the curves $j'\ k'\ l'$ forming contracted throats.

Having thus described my invention, what I claim as new, and desire to secure by Letters Patent, is—

1. The trap $a$, provided with internal partitions which terminate in curves that form contracted throats, as described, and having a tube, $d$, for the purpose set forth.

2. The trap $a$, provided with the tube $d$, and combined with the pipe $g$ by means of the lantern-joint $e\ f$, as specified.

The above specification of my invention signed by me this 30th day of August, A. D. 1871.

HENRY R. ROBBINS.

Witnesses:
SOLON C. KEMON,
CHAS. A. PETTIT. (117)